United States Patent [19]
Ferry et al.

[11] 3,985,703
[45] Oct. 12, 1976

[54] PROCESS FOR MANUFACTURE OF ACRYLIC CORE/SHELL POLYMERS

[75] Inventors: William J. Ferry, Fairless Hills, Pa.; Donald H. Jones, Vincentown; Roger K. Graham, Moorestown, both of N.J.

[73] Assignee: Rohm and Haas Company, Philadelphia, Pa.

[22] Filed: June 24, 1975

[21] Appl. No.: 589,972

[52] U.S. Cl............... 260/42.29; 260/42.32; 260/42.37; 260/42.52; 260/42.55; 260/857 G; 260/885
[51] Int. Cl.² ............ C08J 3/20; C08K 3/04; C08K 3/26; C08K 3/36
[58] Field of Search............ 260/42.55, 42.52, 34.2, 260/885, 857 G, 42.29, 42.32, 42.37

[56] References Cited
UNITED STATES PATENTS
3,678,133  7/1972  Ryan ............................. 260/876 R
FOREIGN PATENTS OR APPLICATIONS
723,315  2/1955  United Kingdom
901,167  7/1962  United Kingdom Primary Examiner—Lewis T. Jacobs
Assistant Examiner—H. H. Fletcher
Attorney, Agent, or Firm—Michael B. Fein

[57] ABSTRACT

A process for the isolation of acrylic core/shell polymers with a high percentage of a rubbery phase by spraydrying in the presence of inert particulate material such as fumed silica in the gaseous drying medium.

8 Claims, No Drawings

PROCESS FOR MANUFACTURE OF ACRYLIC CORE/SHELL POLYMERS

CROSS-REFERENCE TO RELATED APPLICATION

This application is related to application Ser. No. 588,544 in the name of Donald Jones and William Ferry for "MBS Graft Polymers And Process For Their Production" filed June 19, 1975.

BACKGROUND OF THE INVENTION

This invention relates to a process for the preparation of acrylic core/shell polymers. It has been known that acrylic core/shell polymers, wherein a hard shell of poly (lower alkyl methacrylate) homo- or copolymer is polymerized in the presence of at least an equal weight of a rubbery homo- or copolymer of an alkyl acrylate, are useful as impact modifiers for many thermoplastics, especially poly(vinyl chloride). U.S. Pat. Nos. 3,655,825 and 3,678,133 are exemplary of such art. With suitable modification, such modifiers are useful to impart impact to such substrates as poly(methyl methacrylate), styrene-acrylonitrile copolymers, poly(caprolactam), etc. U.S. Pat. Nos. 3,668,274, 3,796,771, 3,793,402, 3,808,180 and 3,843,735 are exemplary of such art.

It has been further known that the ratio of rubbery to hard stage should be as high as possible to make the modifier as efficient as possible in improving the impact strength of the plastic matrix. However, when the acrylic rubber level exceeds 70% by weight of the total polymer weight, it has previously been impossible to isolate the modifiers by spray-drying to yield a free-flowing powder at isolation rates which are practical.

Spray-drying, in which the polymer in aqueous dispersion is atomized in a chamber containing heated air, is an economical, safe and desirable means of isolating such acrylic core/shell polymers in particulate free-flowing form. Attempts to isolate by spray drying modifiers containing 70% rubber phase were thwarted by the pronounced tendency of the modifier to stick to the walls, to bridge over conveying lines entrances, and to exhibit unacceptable powder flow behavior marked by aggregation, lumping, and flow interruptions. Even acrylic core/shell polymers with at least 55% by weight rubber core were spray dryable only at limited throughput rates, and frequently buildup on chamber walls and floor blockages occurred. Attempts to improve powder flow have been varied. The ratio of rubber to hard phase has been reduced or a hard polymer in emulsion form has been co-spray dried. The flow behavior is improved, but at the expense of impact efficiency. Addition of inorganic additives to the emulsion has not been effective in improving flow except at levels high enough (5% or above) to cause severe mixing and pumping problems. Post-addition of flow aids to the dried material is effective but undesirable, calling for an additional and expensive blending step. It is an object of this invention to provide a process of isolating acrylic core/shell polymers of high rubber content by spray drying.

It is a further object to produce acrylic core/shell polymers of at least 55% by weight rubber content at increased spray dryer output levels. These objects and others as will become apparent from the following are achieved by the present invention which comprises spray-drying an acrylic core/shell polymer having at least 55% by weight rubbery core while blowing inert particulate material into the gaseous drying medium.

The acrylic core/shell polymer has at least two stages produced sequentially in emulsion. The first or core stage rubbery latex is preferably poly (n-butyl acrylate) but may be based on ethyl, isobutyl, 2-ethylhexyl, or other lower alkyl acrylates or copolymers of the same. The rubbery core polymer optionally contains up to 20% of other monounsaturated or conjugated dienic copolymerized monomers, such as styrene, vinyl acetate, vinyl chloride, methyl methacrylate, butadiene, isoprene, and the like and optionally up to 5% of a crosslinking polyunsaturated monomer having two or more non-conjugated sites of approximately equal reactivity, such as ethylene glycol diacrylate, butylene glycol dimethacrylate, divinyl benzene, and the like. It also optionally contains up to 5% of a graft-linking monomer having two or more non-conjugated sites of unsaturation of unequal reactivity, such as diallyl maleate, monoallyl fumarate, allyl methacrylate, and the like.

The shell stage, which is optionally chemically grafted to the core rubbery stage, is preferably polymerized from methyl methacrylate and optionally other lower alkyl methacrylates such as ethyl or t-butyl or mixtures of lower alkyl methacrylates. Further, up to 40% by weight based on total shell stage monomers can be other monovinylidene monomers, such as styrene, vinyl acetate, and vinyl chloride, and the like. Agents to control the molecular weight, such as alkyl mercaptans, can be present in either or both stages. The acrylic core/shell polymer is prepared in emulsion, and is isolated from the resulting latex by spray drying in accordance with the invention.

The spray-drying can be conducted in any of a variety of designs. The latex is atomized either by a wheel or by a nozzle, and the drying gas can enter from the top or the bottom of the atomization chamber. The drying gas is preferably heated air or nitrogen. Inert particulate material is blown into the atomization chamber by a separate gas stream or fed into the heated drying gas stream at such a rate to give the desired weight on dry acrylic core/shell polymer solids.

It is preferred that the inert particulate material be fumed silica, such as Cab-O-Sil M-5 (Cabot Corporation) of particle size 0.012 microns. Other inert materials of similar particle size may be used, such as calcium carbonate, titanium dioxide, poly(methyl methacrylate). The additive should be chemically inert, non-reactive with either the core/shell polymer, the thermoplastic matrix, or any other additives, such as stabilizers, lubricants, etc., for that matrix.

Levels of inert particulate material are preferably about 0.01–1.5%, more preferably about 0.1–1.0%, and most preferably about 0.25–0.75%, based on dry weight of acrylic core/shell polymer. Higher levels will achieve the desired improved drying and flow characteristics, but with deleterious effects on physical or optical properties of the modifier/matrix blend, such as clarity, impact strength, melt flow properties, etc.

It has been known to use such additives to improve the flow properties of powder blends, but by dry-blending polymer and particulate. It is also known to add particulate materials in a spray dryer during isolation of natural rubber latex, but at much higher levels and with a necessary adjustment of pH (U.K. Pat. Nos. 723,315 and 901,167); none teach or suggest the addition of such low levels of inert particulate material and their dramatic effect on powder flow without detriment to the other properties of the polymer. The present invention does not involve a pH adjustment step as in the U.K. patents.

The core/shell polymers produced by this process are useful for modifying PVC as well as other thermoplastic polymers such as nylon, polymethyl methacrylate, and others.

The following examples are presented to exemplify embodiments of the invention, but are not intended to be limiting. All parts and percentages are by weight unless otherwise indicated.

EXAMPLES I-III

Following the teaching of Example I of U.S. Pat. No. 3,678,133, the following acrylic core/shell polymers are prepared in aqueous dispersion at around 50% solids.

|  | First Stage Monomers, parts | | | Second Stage Monomer, parts |
|---|---|---|---|---|
|  | BA | BDA | DAlM | MMA |
| I | 79 | 0.5 | 0.5 | 20 |
| II | 74.1 | 0.45 | 0.45 | 25 |
| III | 69.2 | 0.4 | 0.4 | 30 | where BA is butyl acrylate, BDA is butylene glycol diacrylate, DA1M is diallyl maleate and MMA is methyl methacrylate.

The emulsions were spray dried in a Nichols-Niro experimental unit equipped with an atomizer wheel and a top-entering air stream. The fumed silica additive was fed by a Conair Feeder into the inlet air stream. Inlet/outlet temperatures were chosen of 180° C./70° C. Levels of fumed silica on 100 parts polymer solids were as follows:

| Silica Level: | 0 | 0.25 | 0.50 | 0.75 | 1.0 |
|---|---|---|---|---|---|
| Example I | A | B | C | D | E |
| II | A | B | C | D | E |
| III | A | B | C |  |  |

Bulk density, compressibility (Chem. Engineering, p. 163, 1/18/65) and visual powder flow were observed as follows. A low value of compressibility is desirable.

| EXAMPLES | | BULK DENSITY,g/cc | COMPRESS-IBILITY,% | VISUAL POWDER FLOW |
|---|---|---|---|---|
| I | A | could not isolate because of dryer blockages | | |
|  | B | 0.12 | 41 | poor |
|  | C | 0.21 | 18 | poor/fair |
|  | D | 0.27 | 7 | good |
|  | E | — | — | good |
| II | A | 0.17 | 32 | poor |
|  | B | 0.32 | 14 | poor |
|  | C | 0.37 | 11 | fair |
|  | D | 0.37 | 18 | good |
|  | E | 0.37 | 20 | good |
| III | A | 0.31 | 18 | fair |
|  | B | 0.37 | 13 | good |
|  | C | 0.39 | 16 | good |

These data support the improvements in powder flow shown by low levels of inert particulate fumed silica, especially at higher acrylic rubber levels.

EXAMPLE IV

The modifiers of Example I-III were milled with PVC 7 minutes at 177° C. at 26/20 rpm on a two-roll mill, and compression molded into 0.31 cm bars and cut into test pieces. Izod impact strengths were measured at 0°, 16°, and 23° C. The formulation was PVC K=62/modifier/di(n-butyl)tin-S,S,'-bis (alkyl mercapto acetate) stabilizer/glycerol monostearate lubricant-/fatty acid ester in the ratios of 100/X/2.0/0.7/0.3 wherein X represents varying amounts of core/shell modifier at levels of 5, 8, and 10. The following table shows that the inert particulate material additive had no negative effect on impact strength, as would have been expected.

| Izod Impact, kg-cm/cm of notch (* = scattered values) | | | | | | | |
|---|---|---|---|---|---|---|---|
| X | | 5 | | | 8 | | 10 |
| Temp. of Test, °C.: | | 0 | 16 | 23 | 0 | 16 | 23 |
| I | A | 3.8 | 8.2 | 19.1 | 7.6 | 20.7 | 161 |
|  | B | 4.3 | 9.3 | 18.0 | 12.0 | 71.3* | 174 |
|  | C | 7.6 | 11.4 | 51.2* | 8.7 | 19.1 | 143* |
|  | D | 5.4 | 10.9 | 16.3 | 11.4 | 21.2 | 161 |
|  | E | 4.4 | 9.8 | 20.7 | 10.9 | 21.2 | 163 |
| II | A | — | — | 18.5 | — | 18.5 | 122* |
|  | B | — | — | 16.9 | — | 16.3 | 98* |
|  | C | — | — | 16.9 | — | 16.3 | 156* |
|  | D | — | — | 20.1 | — | 18.0 | 103* |
|  | E | — | — | 16.9 | — | 14.2 | 142* |
| III | A | — | — | 12.0 | 7.6 | 16.3 | 94* |
|  | B | — | — | 14.2 | 4.9 | 16.9 | 101* |
|  | C | — | — | 12.5 | 10.3 | 13.1 | 96* |

EXAMPLE V

Selected samples from Examples I-III were examined for static heat stability in a standard PVC screening formulation. No negative effect on heat stability was noted, although it was expected that the inert particulate material would have a negative effect on heat stability.

| Samples | | X Parts Modifier | Color | Minutes to Orange | Char |
|---|---|---|---|---|---|
| Unmodified PVC | | 0 | 30 | 55 | 90 |
| I | A | 3 | 30 | 50 | 90 |
| I | E | 3 | 30 | 50 | 90 |
| II | A | 8 | 30 | 60 | 90 |
| II | E | 8 | 30 | 60 | 90 |
| III | A | 3 | 30 | 50 | 90 |
| III | C | 3 | 30 | 50 | 90 |

Formulation: PVC/modifier/processing aid, MMA-/EA (90/10)/di(n-butyl)tin-S,S''-bis(alkyl mercaptoacetate) stabilizer/glycerol monoricinolate/cetyl palmitate/toner in the ratios of 82.5/X/2.5/1.5/1.6/0.6/0.0035, wherein X represents varying amounts of acrylic core-shell modifier.

An unexpected and commercially desirable result of the use of low levels of inert particulate material in impact modifiers for PVC is illustrated below. Brabender Plasticorder examination of PVC extruded profile or pipe formulation shows an unexpectedly large effect (for such a low level of additive in the final product) on reduction of peak torque and a lengthening of flux time with no effect on equilibrium torque. This can translate into less energy demand on extrusion equipment and, in the case of pipe extrusion, a desired effect of prolonging fusion time until just before the contact.

EXAMPLE VI

Brabender Extrusion-Commercial Pipe Formulation
Formulation: PVC(K=69)/modifier/processing aid MMA/EA (90/10)/organotin stabilizer/aluminum stearate/polyethylene wax/TiO$_2$/carbon black in the ratios of 100/10/1.5/2.0/1.3/0.1/3.0/0.1.
No. 6 Roller Mixer, 60 rpm, 177° C.

| Modifier | Peak Torque, m-gms | Flux Time, sec. | Equilibrium Torque, m-gms |
| --- | --- | --- | --- |
| None | 3400 | 180 | 2650 |
| I A | 4500 | 60 | 2900 |
| I E | 4375 | 60 | 2875 |
| II A | 4550 | 75 | 2750 |
| II E | 4325 | 75 | 2950 |
| III A | 5550 | 45 | 2925 |
| III C | 4850 | 40 | 2825 |

EXAMPLE VII

Brabender Extrusion-Profile Formulation PVC Diamond 450/modifier/processing aid/organotin stabilizer/non-sulfur organotin stabilizer/Al St/parrifin was/.
No. 6 Roller Mixer, 60 rpm, 350° F.

| Modifier | Peak Torque, m-gm | Flux Time, sec. | Equilibrium Torque, m-gm |
| --- | --- | --- | --- |
| None | Did not flux | | |
| I A | 4650 | 15 | 2475 |
| I E | 2650 | 40 | 2350 |
| II A | 4475 | 25 | 2375 |
| II E | 2250 | 40 | 2300 |
| III A | 5125 | 20 | 2350 |
| III C | 3400 | 40 | 2325 |

EXAMPLE VIII

An impact modifier for PVC is prepared following the teachings of Example IV-D of U.S. Pat. No. 3,655,825, where the ratio or rubbery core//hard shell is 70//30. When spray-dried as taught in Example I, powder flow is poor, but when 0.5 parts of particulate silica are added, the flow behavior is greatly improved. No negative effect on properties, such as impact strength, is seen between the two modifiers when blended at 10 phr in PVC as shown in Example I.

EXAMPLE IX

An acrylic core/shell polymer is prepared as taught in Example II of U.S. Pat. No. 3,668,274, except that the styrene and ethylthioethyl methacrylate monomers are replaced by butyl acrylate. When isolated by spray-drying, the polymer sticks to the atomizer chamber walls and is difficult to separate as a free-flowing powder. The addition of 0.6 parts fumed silica (Tullanox) during spray-drying yields a freeflowing powder with no wall buildup.

When the modifiers with and without silica are reacted with poly(caprolactam) as taught in Example 2 of U.S. 3,668,274, no difference is seen in reactivity or in physical properties of the modified polymer.

We claim:

1. A process for producing an acrylic core/shell polymer having 55 to 85 parts of an acrylic rubbery core comprising polymerizing 15 to 45 parts of a hard shell polymer onto a pre-formed rubbery core polymer under emulsion conditions and spray-drying the resultant latex in a spray dryer while blowing 0.01 to 1.5 parts inert particulate material into the gaseous drying media of the spray dryer.

2. The process of claim 1 where the core is 55 to 85 parts of crosslinked alkyl acrylate polymer and the shell 15 to 45 parts of lower alkyl methacrylate polymer.

3. The process of claim 1 where the rubbery core is 55 to 85 parts of a copolymer of 79 to 99.5 parts n-butyl acrylate, 0 to 10 parts of one or more monovinyl or conjugated divinyl monomers, 0.1 to 5 parts crosslinking monomer, and 0.1 to 5 parts graftlinking monomer.

4. The process of claim 3 where the hard shell is 80 to 100 parts methyl methacrylate, 0 to 20 parts monovinylidene unsaturated monomer and 0 to 5 parts unsaturated carboxylic acid.

5. The process of claim 1 where about 0.01 to 1.5% fumed silica based on weight of dry core/shell polymer is introduced into the drying chamber as a solid suspended in the gaseous drying medium.

6. The process of claim 1 wherein the inert particulate material is selected from the group consisting of aluminum silicate, calcium carbonate, carbon black, titanium dioxide, polymethyl methacrylate, zinc oxide, and infusorial earth.

7. The product in free flowing powder form produced by the process of claim 1.

8. Thermoplastic polymers modified with the product of claim 7.

* * * * *